United States Patent [19]

Shellhause

[11] Patent Number: 5,261,235

[45] Date of Patent: Nov. 16, 1993

[54] HYDRAULIC PRESSURE ACTUATING SYSTEMS AND RESERVOIRS FOR SAME

[75] Inventor: Ronald L. Shellhause, Vandalia, Ohio

[73] Assignee: RMS Engineering, Inc., Vandalia, Ohio

[21] Appl. No.: 964,786

[22] Filed: Oct. 22, 1992

Related U.S. Application Data

[60] Division of Ser. No. 785,493, Oct. 31, 1991, Pat. No. 5,182,911, which is a continuation-in-part of Ser. No. 649,032, Feb. 1, 1991, Pat. No. 5,133,439.

[51] Int. Cl.$^5$ .......................... F15B 7/00; B60T 11/26
[52] U.S. Cl. ........................................ 60/581; 60/583; 60/585
[58] Field of Search ............... 60/413, 534, 547.1, 60/547.2, 581, 583, 584, 585, 586, 589, 590

[56] References Cited

U.S. PATENT DOCUMENTS

| | | | |
|---|---|---|---|
| 1,945,728 | 2/1934 | Brush | 60/585 |
| 3,359,728 | 12/1967 | Torossian | 60/534 |
| 3,792,433 | 2/1974 | Wada | 60/534 X |
| 3,913,327 | 10/1975 | Shellhause | 60/585 |
| 4,133,287 | 1/1979 | Downs | 60/534 X |
| 4,152,897 | 5/1979 | Falk | 60/589 X |
| 4,407,125 | 10/1983 | Parsons | 60/585 X |
| 4,893,473 | 1/1990 | Hool et al. | 60/585 X |
| 4,981,016 | 1/1991 | Coleman | 60/585 |
| 5,003,780 | 4/1991 | Shellhause | 60/585 |

*Primary Examiner*—Edward K. Look
*Assistant Examiner*—Hoang Nguyen
*Attorney, Agent, or Firm*—D. D. McGraw

[57] ABSTRACT

A hydraulic pressure actuating system has a master cylinder pivotally mounted to the dash panel in line with the actuator pedal, a remotely mounted hydraulic fluid reservoir assembly positioned at the high point of the system for selfbleeding, and an actuating device actuated by pressurized fluid generated by actuation of the master cylinder. The reservoir assembly uses a fluid flow valve mechanism to control its connection with the fluid passage of the system. Several types of reservoirs are disclosed, including a siphon tube arrangement and various flexible bag arrangements. The reservoir volume is contained in minimum space by using a side-saddle reservoir arrangement. Indicator arrangements are also disclosed which when actuated indicate actuation and release of the master cylinder in one instance and the amount of fluid in a flexible bag reservoir in another instance.

19 Claims, 6 Drawing Sheets

HYDRAULIC PRESSURE ACTUATING SYSTEMS AND RESERVOIRS FOR SAME

This application is a division of co-pending U.S. patent application Ser. No. 07/785,493, entitled, "Hydraulic Pressure Actuating Systems and Reservoirs for Same" and filed Oct. 31, 1991 now U.S. Pat. No. 5,182,911; which application is a continuation-in-part of U.S. patent application Ser. No. 07/649,032, entitled "Fluid Pressure Actuated Actuator Mechanism for Clutches and the Like", filed on Feb. 1, 1991, and issued as U.S. Pat. No. 5,133,439 on Jul. 28, 1992.

FIELD OF THE INVENTION

The invention relates to hydraulic pressure actuating systems, and more particularly to such systems in which a master cylinder is an in-line structure positioned between an actuator such as a foot pedal and a reservoir. It also relates to reservoirs for such systems as well as for other fluid pressure actuating systems. One example of a hydraulic pressure actuating system embodying the invention is one for disengaging mechanically operated mechanisms such as clutches and the like. Other systems embodying the invention may be employed for engaging other similar mechanically released mechanisms, and for operating other mechanisms by fluid pressure. The preferred embodiment shown in the drawings is particularly related to such actuator mechanism for disengaging a friction clutch of the type commonly used in automotive vehicles and with other engine and transmission power trains. The invention may also be embodied in vehicle brake actuating systems. The reservoirs of the invention may be used in any fluid pressure actuating system in which a reservoir of hydraulic fluid is required.

BACKGROUND OF THE INVENTION

The predecessor clutch actuator mechanism of U.S. Pat. No. 4,328,883, entitled "Hydraulic Actuator Mechanism for a Friction Clutch" and issued May 11, 1982, in the name of the inventor of the invention herein disclosed and claimed, provides some of the background for the preferred embodiment of this invention. That disclosure provided an earlier designed hydraulic pressure operated mechanism disposed between the master cylinder manual clutch operator and the clutch throw out bearing. Other related patents are included in the patent references made of record in the above-noted U.S. patent. The disclosure of this patent is described in detail in the above-identified co-pending patent application, and therefore is not repeated here.

U.S. Pat. No. 5,003,780, entitled, "Fluidic Valve Mechanism" and issued to the inventor of the invention herein disclosed and claimed on Apr. 2, 1991, provides additional background for the invention. That patent discloses and claims a fluid flow sensitive valve mechanism positioned in a valve chamber between first and second inlet-outlet ports. The valve mechanism controls the opening and closing of a third inlet-outlet port in response to the flow of fluid to and from the valve chamber through two or more of the ports. That patent also discloses and claims a master cylinder for a brake system with the valve mechanism being a part of the master cylinder, a generic push-pull hydraulic cable arrangement using the valve mechanism, and a vehicle parking brake system where the valve mechanism is in a hydraulic substitute for the Bowden wire type of parking brake cable. The valve mechanism of U.S. Pat. No. 5,003,780 is preferably employed in the actuating system of the invention herein disclosed and claimed, and also is preferably employed in conjunction with the reservoirs and the master cylinders using the reservoirs also herein disclosed and claimed.

CO-PENDING PATENT APPLICATION

The above identified co-pending U.S. patent application Ser. No. 07/649,032 now U.S. Pat. No. 5,133,430, of which this application is a continuation-in-part, provides additional disclosure relating to the invention herein disclosed and claimed. That application more fully discloses and claims a clutch actuating mechanism over which the various aspects of the invention herein disclosed and claimed are modifications, additions and improvements. The disclosure of that application is hereby incorporated herein by reference.

SUMMARY OF THE INVENTION

The actuating system embodying the invention, when incorporated as a hydraulic clutch actuator system, permits the master cylinder operating the hydraulic clutch actuator, the hydraulic fluid reservoir for the master cylinder and the hydraulic clutch actuator, and the connecting hydraulic lines to be installed as a complete subassembly in a vehicle. The master cylinder is preferably so mounted as to be in-line with the push rod of the clutch pedal or other clutch controller, preferably on one side of the vehicle dash or firewall, with the reservoir assembly mounted on the other side thereof. The master cylinder is quickly and easily secured in place without the use of the usual mounting bolts, nuts and flanges. It occupies substantially less space in the vehicle engine compartment than does a typical unitary master cylinder and reservoir for a clutch or brake, and only a minimum amount of space on the clutch pedal side of the dash beyond that normally occupied by the push rod.

As disclosed and claimed in the above identified co-pending patent application, the clutch actuator part of the system is positioned in a previously assembled clutch housing with its clutch including its bearing retainer and throw out bearing in place, as well as the clutch output shaft. The clutch output shaft is usually the transmission input shaft, which extends through the bearing retainer, the throw out bearing, the friction clutch, and is journaled in the flywheel or engine crankshaft at its output end. The fluid pressure conduit to the actuator from the master cylinder, typically a somewhat flexible tube or pipe capable of withstanding the pressures generated therein with safety, is opportunely routed through the access opening of the clutch housing at the end connected to the clutch actuator and through an access opening in the dash or firewall at the end connected to the master cylinder.

When the actuating system is a sealed system which is ready to install and use, the actuator housing is inserted in place in the clutch housing through the access opening, and is readily located and retained in place axially and radially. The fluid reservoir and connecting tube or pipe are placed in position with the reservoir suitably mounted on the dash or firewall, and the master cylinder is inserted through the opening for it in the dash or firewall. It is connected to the clutch pedal and positioned in place in the indentation on the dash or firewall panel provided to receive it. It is then secured in place by either a clip or the cover for the opening in the dash, or both. The reservoir portion of the system is mounted at the highest point in the system so that the system is automatically bled, as more particularly described in U.S. Pat. No. 5,003,780 noted above.

Advantages obtainable by employment of the system embodying the invention are numerous. As used in a clutch operating system or vehicle brake operating system, for example, they include:

(1) Simpler initial installation.

(2) Elimination of external and internal threaded fasteners to hold the actuator housing and the master cylinder in place.

(3) Freedom to schedule installation of the actuator mechanism, fluid reservoir and master cylinder, either individually or preferably as an entire sealed system, on a production line before or after the device or devices being operated by the system are installed in place.

(4) Time saving when repairs must be made to the actuator or the master cylinder or the reservoir. As noted in the co-pending patent application, when the actuator is a clutch actuator, the actuator is easily removed from the clutch housing without having to disconnect and drop the transmission, repair or replace it, reinstall it, and then reinstall and connect the transmission. In the system of this application, the same concept is true for the master cylinder. It is quickly and easily removed by disconnecting it from the pedal, releasing its mounting means, whether a clip or the opening cover, and bringing it into the engine compartment where it may be readily disconnected, repaired or replaced and reinstalled.

(5) Much of the actuator mechanism, reservoir and master cylinder may be made of cast, stamped or reinforced molded plastic parts, including the actuator housing as well as the cylinders and pistons, with appropriate wear surfaces of metal or other acceptable materials being provided at the points of likely wear. Judicious selection of such materials can materially reduce costs and weight, increase ease of manufacture, assembly, repair or replacement, and the time required for installation.

(6) It performs more efficiently than other, more complicated systems without the complexity and losses of time, materials and effort of prior designs.

Similar advantages are present when the system embodying the invention is a brake system or a control system used in place of a Bowden wire cable.

The reservoirs disclosed and claimed provide for greater volumes of reserve hydraulic fluid in minimum space, and the ability to maintain a sealed system without the risk of introducing air into the system fluid either through the reservoir or actuators such as brake wheel cylinders, clutch actuators, and the like.

Other advantages available by practice of the invention will become evident with a full understanding of the description and drawings as provided hereafter.

DETAILED DESCRIPTION OF THE PREFERRED EMBODIMENTS

Figure 1:
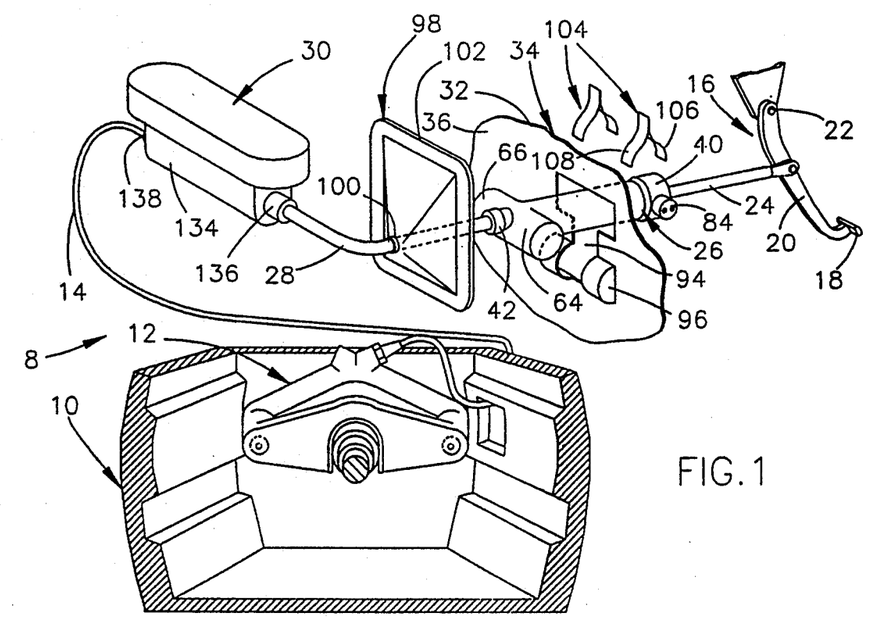
FIG. 1 is a perspective view, with parts broken away and shown in section, schematically showing a hydraulic fluid actuating system embodying the invention. The particular system shown is a clutch actuating system. It is shown as being in the process of installation of the master cylinder, cover and reservoir assembly.

The fluid pressure actuating system 8 of FIG. 1 schematically illustrates the inventive system as embodied in a friction clutch actuating mechanism with the friction clutch mechanism being omitted for clarity. It is to be understood that systems embodying the invention may operate mechanisms other than clutch actuating mechanisms. By way of example but not of limitation, such mechanisms may be vehicle service brakes or parking brakes, stationary machinery brakes, systems for controlling operating parts of farm, road, marine or industrial machinery such as mowers, plows, fork lifts, transmission shift mechanisms, windlasses, heating and air conditioning duct doors, throttle control mechanisms, aircraft and spacecraft controls, and the like.

Now describing the particular system disclosed, transmission bell housing 10, which is the clutch housing for friction clutch (not shown) and its actuating mechanism, has a fluid pressure clutch actuator 12 therein. The actuator 12 is connected by a fluid pressure conduit 14 such as a preferably flexible tube or pipe to a fluid pressure operator, shown schematically as a manually operated pedal mechanism 16. Mechanism 16 is shown as including a foot pad 18 mounted on a pedal lever 20 which is pivoted on a pin 22 and drivingly connected to a push rod 24. The push rod 24 is shown as being connected to act on a master cylinder 26.

The pressure generated in the master cylinder 26 is delivered through the tube or pipe 14 to the actuator 12. Actuator 12 may be of the type shown and described in detail in the above identified co-pending patent application and is therefore not further described here. Likewise, the clutch mechanism actuated by actuator 12 is shown in described in detail therein, and is not shown or further described here.

Installation and removal of the actuator housing mechanism 12 may be readily accomplished as also described in the above identified co-pending patent application. The actuator mechanism 12 may then be examined, repaired as needed, and replaced in the clutch housing 10, or a new mechanism may be installed. Throughout the removal and replacement operations, the flexible tube or pipe 14 may remain secured to inlet port of actuator mechanism 12 if desired.

If the actuator is part of a sealed system as discussed above, the new or reconditioned system is properly filled with appropriate fluid, bled as needed, and sealed so that it is ready for use. As later noted, it will also be self-bleeding after installation and as a few actuation and release cycles are carried out by simply pumping the pedal several times. It may be returned to stock for later use or immediately installed.

System 8 also includes a tube or pipe 28 connecting the master cylinder 26 to the reservoir assembly 30. Tube or pipe 14 connects reservoir assembly 30 to the actuating mechanism 12. In the preferred embodiment, master cylinder 26 is mounted on the pedal side 32 of the panel 34, which may be a vehicle dash or firewall with the vehicle engine compartment being on the side 36 of the panel 34. The reservoir assembly 30 is mounted in the vehicle engine compartment, and may also be mounted on panel 34. Suitable mounting means may be used for mounting the reservoir assembly, but none are specifically illustrated since the particular mounting arrangement of the reservoir assembly is not part of the invention herein disclosed and claimed. As earlier noted, the reservoir assembly 30 is mounted at the highest point of the system 8 so that any air in the system is automatically bled out through the valve control mechanism for the reservoir.

Figure 2:
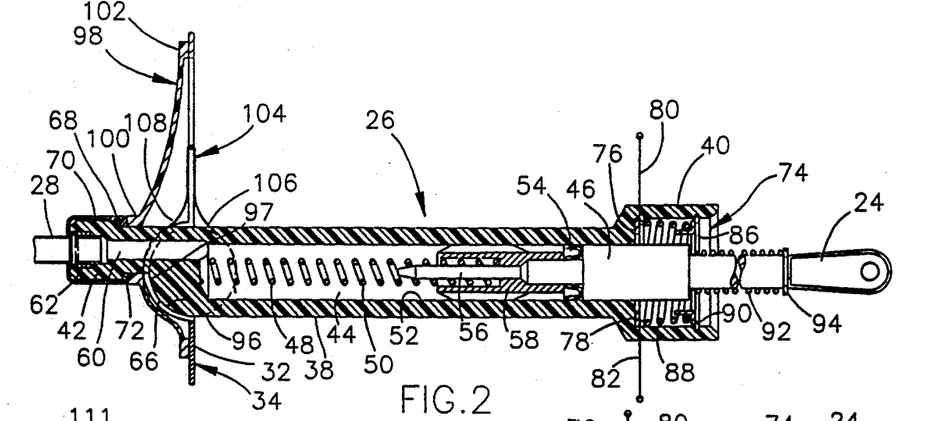
FIG. 2 is a cross-section view with parts broken away, showing the master cylinder of the system of FIG. 1 and its mounting arrangement after installation of the master cylinder and its cover is completed. It also shows a switch mechanism for providing signals indicating actuation and release operation of the master cylinder.

Master cylinder 26, also illustrated in cross section in FIG. 2, is a single pressurizing chamber master cylinder when the system is used with a clutch actuating and release mechanism. The same may be true when the system is used with a parking brake actuating mechanism. It is to be understood that when it is used with the service brakes of a vehicle the master cylinder will usually be a dual pressurizing chamber master cylinder, or may have as many as one pressurizing chamber for each brake unit being actuated. Master cylinder 26 has a body 38 having a rear end 40 and a forward end 42. Body 38 has a bore 44 opening rearwardly through end 40. A pressurizing piston 46 is reciprocally received in bore 44. Piston return spring 48 is in the pressurizing chamber 50 defined by piston 46 and the side wall 52 of bore 44. Piston 46 has a cup seal 54 at its forward end wall, and a piston extension 56 extending forwardly from that end wall to provide a support for spring seat 58, a guide for part of spring 48, and a stop limiting the amount of pressurizing movement of piston 46 in bore 44. The forward end of bore 44 is connected to a fluid passage 60 extending in the same axial direction as bore 44, which in turn is connected by a suitable connection 62 to one end of tube or pipe 28.

The master cylinder body 38 has a cross member or trunnion 64 formed near its forward end 42. Trunnion 64 has an outer curvilinear surface 66 which is cylindrically shaped. The forward end 42 of the master cylinder 26 extends forwardly from the trunnion. End 42 has a necked portion 68 separating the enlarged portion 70 of end 42 from the trunnion surface 66. Thus a shoulder 72 is provided which faces the trunnion but is axially spaced from it.

The rear end 40 of the master cylinder body 38 is illustrated as being radially enlarged, as is the part of the bore 44 extending through it. This provides space for a switch mechanism 74 which is somewhat schematically shown in FIGS. 2 and 3. The master cylinder body 38 is preferably made of an electrically non-conductive material such as a suitable plastic. Substantially semi-circular switch contacts 76 and 78 are secured in the radially enlarged part of bore 44 against the shoulder formed by that enlargement. These contacts have their adjacent ends circumferentially spaced apart so that they have no direct electrical contact at any time. They are schematically illustrated as respectively having electrical leads 80 and 82 leading to the exterior of the master cylinder body. These leads are shown in FIG. 1 as having an appropriate electrical plug connection 84 to which the wires of a wiring harness are connected. A contact-engageable member 86, formed as an electrically conductive disk, is received in the enlarged portion of master cylinder body end 40 so as to have some axial movement therein. It is urged out of contact with switch contacts 76 and 78 by a spring 88, and normally engages a stop 90 provided in the bore end. It is engaged by one end of spring 92, which is received about a part of the push rod 24 which is secured to or integrally formed with piston 46 and has its other end seated on spring seat 94, formed as a part of push rod 24. Spring 92 has a higher spring rate than spring 88, so that when push rod 24 is moved in the master cylinder actuating direction, spring 88 is compressed and contact-engageable member 86 is moved into electrical contact engagement with contact members 76 and 78. This closes the switch 74, and a signal may then be generated indicating that the master cylinder has been actuated. Spring 88 yields to permit additional actuating movement of the piston 46 without commensurate movement of the contact-engaging disk 86. The axial space between switch contacts 76, 78 and contact-engageable member during master cylinder release may be much less than that schematically illustrated, permitting the switch to be closed quickly.

The arrangement for mounting the master cylinder 26 is an important aspect of the invention, and will now be described. Panel 34 has a T-shaped opening 94 formed in it with the cross portion of the T being of a size and shape to admit the rear end 40 of the master cylinder body and also the trunnion 64, as well as the rest of the master cylinder body. The downwardly extending part of the T has an indentation 96 with parts on either side of the downwardly extending part of the T formed by being struck out of the panel 34. Both parts of indentation 96 are curvilinear and substantially semi-circular in cross section.

The master cylinder is passed through the opening 94. It is shown in FIG. 1 as being in the process of being passed through opening 94. After the trunnion 64 has completed the passage, the master cylinder is moved downwardly in opening 94 until the trunnion is aligned with the indentation 96. The master cylinder is then moved forwardly so that the curvilinear outer surface 66 of the trunnion 64 mates with the concave curvilinear surface 97 of the indentation 96. This arrangement defines a pivotal connection between the panel and the master cylinder, allowing the master cylinder to pivot in a plane perpendicular to the mating curvilinear surfaces. This plane is preferably the same plane as the plane of movement of the brake pedal arm 20 during pedal movements. The curvilinear surfaces 66 and 97 may be coated with materials minimizing friction and wear without requiring periodic lubrication.

The master cylinder may be so retained in position that the trunnion 38 is always in pivotal contact with the indentation curvilinear surface 97. One retention arrangement is shown in FIG. 1, in which the cover 98 is provided with an opening 100 through which is received tube or pipe 28. After the master cylinder is in place as shown in FIG. 2, cover 98, being sufficiently flexible at least in the area of its opening 100, is moved so that it snaps over the master cylinder enlarged end portion 70 and fits about the necked portion 68 and engages shoulder 72. The outer peripheral portion 102 of cover 98 engages the side 36 of panel 34 and is sufficiently large to cover the entire opening 94 as well as the back side of the panel indentation 96 and any parts of the panel that might be open because of the formation of the indentation parts on each side of the bottom part of opening 94. In this arrangement, cover 98 may have some spring-like characteristics somewhat like a Belleville spring urging it into panel engagement in order to remain in sealing contact with the panel.

Another arrangement for retaining the master cylinder is shown in FIG. 2. One or more clips 104 are arranged to fit through the outwardly extending arm-like upper parts of the opening 94. Each clip has a finger 106 extending downwardly so as to engage the trunnion on the side away from the panel indentation 96, and another finger 108 extending on the other side of the panel 34 so as to engage the part of the panel side 36 from which the indentation parts are formed, effectively holding the trunnion in place in the indentation. Clip or clips 104 may be separate from the cover 98 or may be made integrally with it in the molding process, omitting most of finger 108, so that the clip or clips may be inserted into position through opening 94 and then positioned laterally and downwardly so that finger 106 retains the trunnion.

Figure 3:
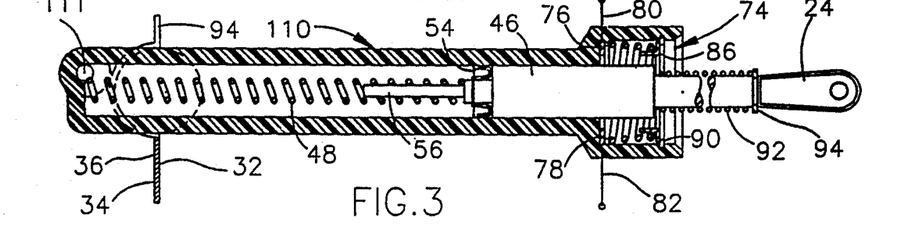
FIG. 3 is a cross-section view with parts broken away, showing another master cylinder, its mounting and switch as may be employed in the system of FIG. 1.

FIG. 3 shows a master cylinder 110 which is very similar to master cylinder 26, but has the fluid passage 112 extending laterally instead of longitudinally of the master cylinder body end. This requires modification of the cover 98 to accommodate this arrangement, and would usually be used only if it were necessary to have tube or pipe 28 lie near panel side 36 as it leaves the master cylinder.

Figures 4, 5, 7:
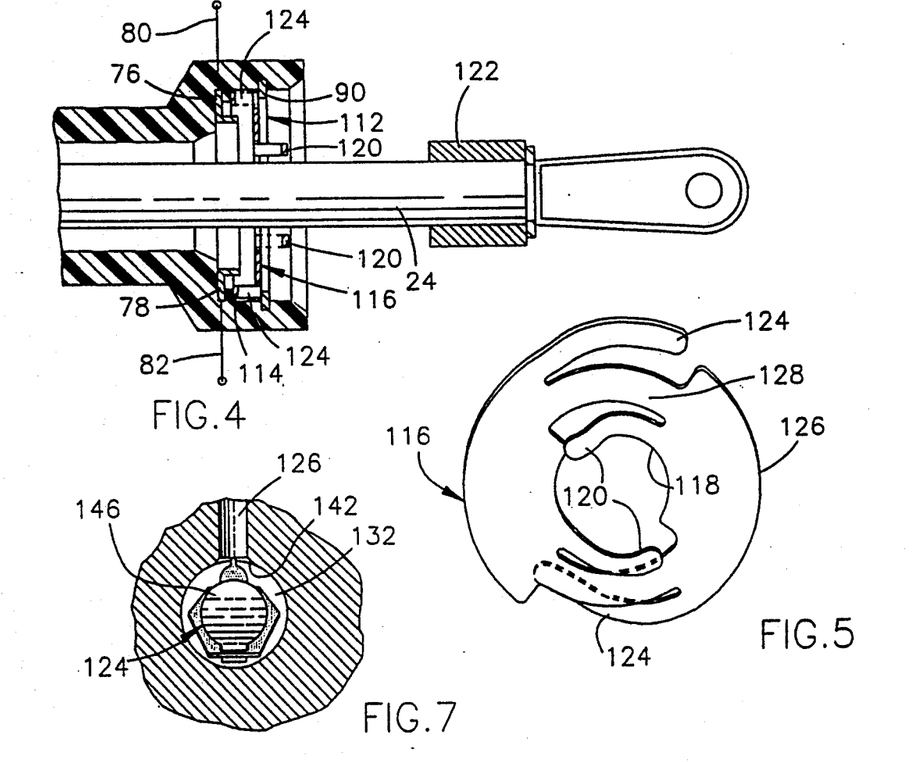
FIG. 4 is an fragmentary enlarged cross-section view of one end of the master cylinders of FIGS. 2 and 3 and containing a modified switch construction.
FIG. 5 is a perspective view of a portion of the switch of FIG. 4.
FIGS. 6 and 7 are illustrations of the valve mechanism shown and claimed in U.S. Pat. No. 5,003,780 noted above, that valve mechanism being preferably incorporated in the reservoir assembly of FIG. 1 and the reservoirs of FIGS. 8-22 described below.

FIG. 4 shows switch 112, which is functionally comparable to switch 86, in detail. Switch 112 has a modified disk and spring arrangement. The master cylinder end 40 is constructed as before, as are the contacts 76 and 78 and their schematically shown leads 80 and 82. A disk stop 90 is provided as before, as is a shoulder 114 adjacent to but radially outward of the portions of the switch contacts 76 and 78 to be engaged by the disk-like contact engageable member 116. Member 116 is an annular disk. Its inner periphery 118 defines an opening through which push rod 24 is received. Just radially outward of the inner periphery a plurality of spring fingers 120 are struck from the plane of the disk so as to extend away from the switch contacts 76 and 78. These spring fingers 120 are so aligned that they are engageable by the ferrule 122 mounted on push rod 24 when the push rod is moved a predetermined distance in the actuating direction. A plurality of other spring fingers 124 are struck out of the plane of the disk at the outer periphery 126 of the annular member 116. Spring fingers 124 extend toward the switch contacts 76 and 78, but are radially outward of them so that they engage the shoulder 114 rather than the switch contacts. The disk member 116 has an annular intermediate section 128 remaining in the plane of the disk and located radially outward of fingers 120 and radially inward of fingers 124. When ferrule 122 engages spring fingers 120, it moves the disk section 128 against the spring force of fingers 124 into engagement with the switch contact 76 and 78, closing the switch. Fingers 120 and 124 continue to yield with further actuating movement of the push rod 24. Fingers 124 are considerably longer in an arcuate direction than fingers 120, and so have a lower spring rate and yield more. Ferrule 122 may be made of an axially yieldable material such as sponge rubber so that it also yields to permit further actuating movement of the push rod. Instead of the ferrule 122, a spring such as spring 92 may be used.

With this arrangement, no particular circumferential orientation of the member 116 in relation to the switch contacts 76 and 78 is required, simplifying assembly.

Figure 6:
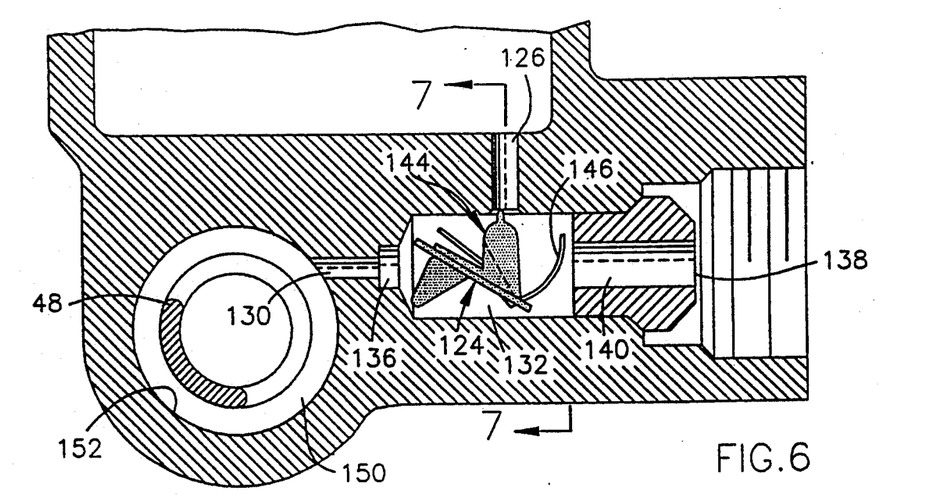
Figure 8:
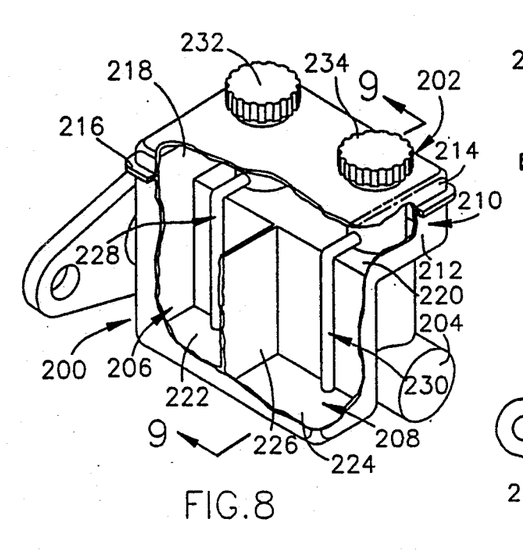
FIG. 8 is a perspective view, with parts broken away, of a reservoir assembly of a type that may be used in the system of FIG. 1. The valve mechanism of FIGS. 6 and 7 may be incorporated in the body portion of the reservoir. The reservoir may also be provided as a part of a master cylinder when the master cylinder is located with the reservoir instead of being remotely located as shown in FIG. 1. It is shown as being provided for a dual chamber master cylinder or reservoir assembly.

FIGS. 6 and 7 are the same as FIGS. 2 and 3 of U.S. Pat. No. 5,003,780 noted above, except for the reference characters. Valve mechanism 124 controls the compensation port 126 operatively connecting the pressurizing chamber 50 with the reservoir chamber 128. When there is more than one pressurizing chamber, a similar valve mechanism preferably controls another compensation port usually connected to another part of the reservoir chamber. This arrangement is used in dual chamber master cylinders, for example. In quad chamber master cylinders, one valve mechanism for each pressurizing chamber may be used, or one valve mechanism may be used for each of two pairs of pressurizing chambers. In the clutch mechanism of FIG. 1, however, there is a single master cylinder pressurizing chamber and therefore only one valve mechanism is needed. Port 130 is illustrated as extending laterally from pressurizing chamber 50 and opens into valve chamber 132. The connecting function of port 130 between chambers 50 and 132 is performed in FIG. 1 by tube or pipe 28. The connection of tube or pipe 28 with the body 134 of reservoir assembly 30 is at inlet 136, and the connection of tube or pipe 14 is at outlet 138. Inlet 136 is therefore comparable to the part of port 130 near valve chamber 132. Another port 140 communicates valve chamber 132 with outlet 138 to which tube or pipe 14 is connected. Ports 130 and 140 are in fluid flow alignment and may be considered to be an inlet-outlet passage in which valve chamber 132 is formed. Compensation port 126 extends from reservoir chamber 128 to valve chamber 132 through a valve seat 142 formed at the point where port 126 opens into chamber 132. Valve mechanism 124 includes a valve member 144 and a valve member positioning device 146. The detailed description of the valve mechanism 124 and its operation found in U.S. Pat. No. 5,003,780 is now referred to for further details and that description is hereby incorporated by reference. It is noted that ports 130 and 140 are always fluid connected through chamber 132, and that port 126 is selectively connected and disconnected with chamber 132, and therefore with ports 130 and 140, by action of the valve mechanism 124. Basically, when pressure is generated in the master cylinder, the flow of fluid into chamber 132 from port 130 acts to move the valve member 144 and quickly close compensation port 126. Upon release of the master cylinder, the return flow of fluid entering chamber 132 through port 140 acts to move the valve member to open the compensation port 126 so that the returning fluid can flow back into the reservoir chamber 128. The details of this controlled operation are fully set forth in the referenced patent and are to be consulted for a fuller understanding.

FIGS. 8-11 show a reservoir assembly 200. It includes a reservoir chamber section 202 and a body 204. Body 204 may include one or more valve mechanisms of the type shown in FIGS. 6 and 7. Since the reservoir assembly is shown as having two reservoir chamber sections 206 and 208, there would usually be two such valve mechanisms employed. Body 204 may be connected by appropriate tubes or pipes to a master cylinder in a manner similar to that shown in the system of FIG. 1 in which the reservoir assembly is remotely mounted relative to the master cylinder and the actuator mechanism. Body 204 may also be the body of a master cylinder arranged in relation to the reservoir chambers in the fashion shown in FIGS. 6 and 7 when the reservoir assembly and the master cylinder are to be integrated. Also, when a single pressure chamber master cylinder such as master cylinder 26 is used, only one reservoir chamber section 208 and its associated structure is required.

The reservoir chamber sections 206 and 208 are formed by a reservoir chamber housing 210. Housing 210 is preferably made of molded plastic and is sealingly mounted to body 204. It includes the lower portion 212 and the upper portion 214, joined together in sealed relation at 216. Chamber sections 206 and 208 have respective upper parts 218 and 220, and respective lower parts 222 and 224. The upper portion 214 of housing 210 is effectively a cover for the upper and lower parts of chamber sections 206 and 208. A divider wall 226 in the lower portion 212 of housing 210 separated the chamber sections 206 and 208. This separation may end at the upper edge of divider wall 226, or a mating divider wall may be provided as a part of housing upper portion 214 to complete the separation. Alternatively, divider wall 226 may extend upwardly until it is sealingly engaged by housing upper portion 214 to complete the separation.

Siphon tube assemblies 228 and 230 are respectively provided in chamber sections 206 and 208. These assemblies are substantially identical. Assembly 230 is shown in greater detail in FIG. 9, and assembly 228 is shown in greater detail in FIG. 11.

Filler caps 232 and 234 are respectively provided in housing upper portion 214. As better shown in FIGS. 9 and 11, they engage the associated siphon assemblies when closed, and when removed permit the direct filling of the reservoir assembly.

Figure 9:
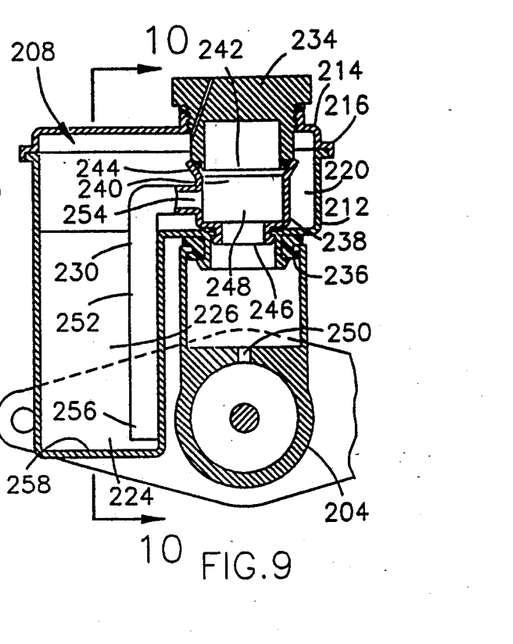
FIG. 9 is a cross section view of the reservoir assembly of FIG. 8, taken in the direction of arrows 8—8 of that FIGURE, and having parts broken away.

Referring now to FIG. 9, it can be seen that the upper part 220 of reservoir chamber section 208 extends over the body 204 and is secured to that body by grommet seal 236. The lower part 224 of reservoir chamber section 208 extends downwardly from upper part 220 alongside body 204. This general arrangement is herein referred to as a sidesaddle reservoir arrangement. The volume of the reservoir section 208 is greatly expanded by the provision of lower part 224 as compared to reservoirs which are mounted totally over a master cylinder or body 204.

Of course, when much of the fluid is even with or even below the level of body 204, there must be some arrangement for removing the fluid as needed and for returning the fluid to the reservoir chamber as needed. This is accomplished in reservoir assembly 200 by the provision of the siphon assemblies 228 and 230, with siphon assembly 230 being shown in FIG. 9. That assembly includes a hollow cylindrical portion 238 which is open at its upper end 240 and arranged to receive the closed end 242 of filler cap extension 244 in sealing relation. When the filler cap 234 is threaded into position to close the reservoir chamber section 208, it closes and seals the upper end 240 of siphon assembly portion 238. The portion 238 is also open at its lower end 246 so that its interior volume 248 is in fluid communication with the compensation port 250 of the body 204. Port 250 is comparable to compensation port 126 of FIGS. 6 and 7, and is under control of the valve mechanism in body 204. A siphon tube 252 is connected with the interior volume 248 of hollow cylindrical portion 238 at its upper end 254, and it extends downwardly in chamber section lower part 224 with its lower end 256 being slightly above the bottom 258 of that chamber section lower part.

When fluid from the reservoir chamber is required and the valve mechanism in body 204 opens compensation port 250, the fluid in the valve chamber of the body 204 is at subatmospheric pressure. It is being sucked through the siphon tube 256, internal volume 248 and compensation port 250 to fill the increasing volume of the master cylinder and the fluid passage means to make up fluid in them as needed. This usually occurs during a fast master cylinder release when the fluid from the actuating device such as device 12 of FIG. 1 does not return fluid to the valve chamber as fast as it is needed because of the return movement of the master cylinder pressurizing piston as it moves to the release direction.

Figure 11:
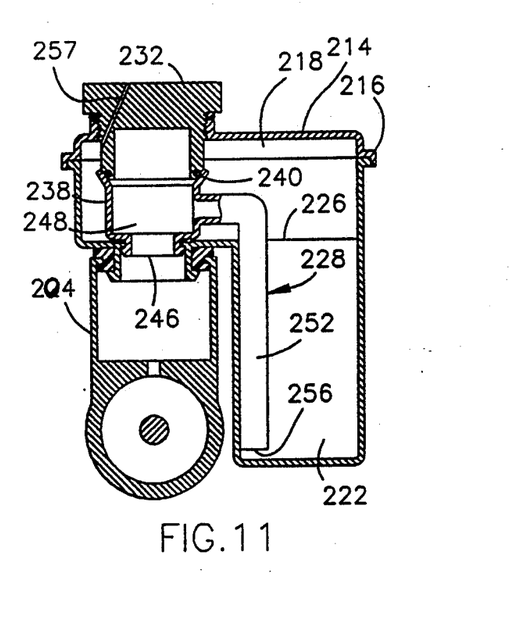
FIG. 11 is a cross section view of the reservoir assembly of FIGS. 8, 9 and 10, taken in the direction of arrows 11—11 of FIG. 10, and having parts broken away.

When fluid is being returned to the reservoir, it passes through the open compensation port 250 and through the siphon tube assembly, being discharged into reservoir chamber lower part 224 through the siphon tube end 256. A suitable vent for the upper part 220 of reservoir chamber section 208 is provided by the filler cap construction. FIG. 11 shows this as a vent passage 258.

Figure 10:
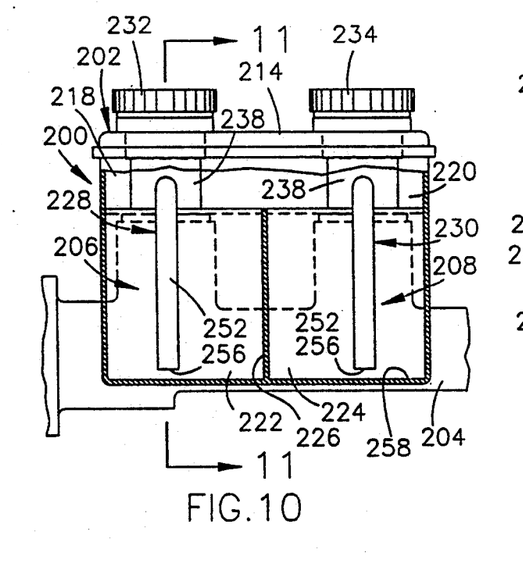
FIG. 10 is a cross section view of the reservoir assembly of FIGS. 8 and 9, taken in the direction of arrows 10—10 of FIG. 9, and having parts broken away.

FIG. 10 shows the reservoir sections 206 and 208 and their respective siphon tube assemblies 228 and 230. Since the assemblies 228 and 230 are identical, the same reference characters are used for the same parts of both of them. For this reason, the same siphon assembly reference characters are used in identifying parts of siphon assembly 228 in FIG. 11 as are used in FIG. 9 for siphon assembly 230.

Figures 12, 13, 14, 15:
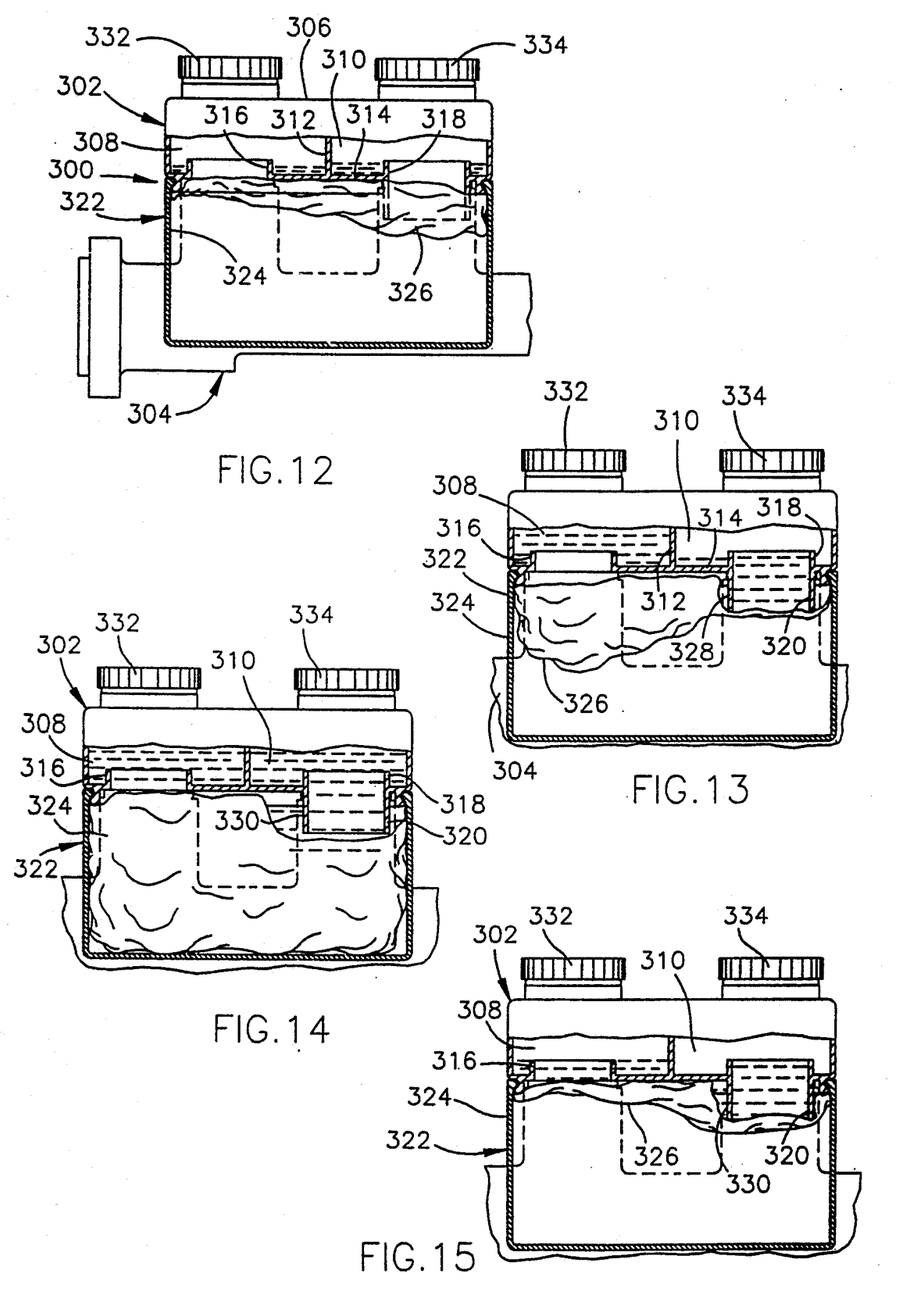
FIG. 12 is a cross section view similar to FIG. 10 showing a modified reservoir assembly and having parts broken away. It shows a flexible bag as part of the reservoir chamber, with most of the hydraulic fluid having been removed from the reservoir chamber so that the flexible bag has decreased in effective volume.
FIG. 13 is a cross section view like that of FIG. 12 showing the reservoir assembly of that FIGURE having minor modifications and when hydraulic fluid has been removed from one part of the reservoir chamber because of leak or other failure of one hydraulic circuit of the hydraulic system to which that part of the reservoir chamber is connected.
FIG. 14 is a cross section view like that of FIG. 12 showing the reservoir assembly of that FIGURE when the reservoir assembly is full of hydraulic fluid.
FIG. 15 is a cross section view like that of FIG. 13 showing the reservoir assembly of that FIGURE after the other part of the reservoir chamber has had most of the hydraulic fluid removed from it and the leak or other failure causing such removal has also removed all of the hydraulic fluid from the one part of the reservoir chamber that it can remove.

FIG. 12 shows a modified reservoir assembly 300. It has a reservoir chamber section 302 and a body section 304. The body section is comparable to body 204 of FIGS. 8–11. As in those figures, it may be primarily a valve chamber and valve mechanism with inlets and outlets because the reservoir assembly is remote from the master cylinder, or it may also incorporate the master cylinder.

The reservoir chamber section is also of the sidesaddle type, with the upper portion 306 being divided into two reservoir chamber parts 308 and 310 by divider wall 312. These chamber parts are connected with the valve chambers in the body 304 through compensation ports not shown, but much like the reservoir chamber 128 of FIG. 6 is connected with valve chamber 132 through compensation port 126. Upper portion 306 has a bottom 314 extending across both chamber parts 308 and 310. An upwardly extending standpipe 316 extends from bottom 314 in chamber part 308 and an upwardly extending standpipe 318 extends from bottom 314 in chamber part 310. Standpipe 318 also has a downwardly part 320, better seen in FIGS. 13–15. Both standpipes open into the lower, side portion 322 of the reservoir chamber assembly. Portion 322 is a container 324 with a flexible bag 326 in it. Bag 326 is placed in secure sealing relation to and under bottom 314 so that the standpipes 316 and 318 open into it. The bag is supported by container 324 when it contains hydraulic fluid, and particularly when it is full of hydraulic fluid as shown in FIG. 14. Standpipe downwardly extending part 320 is provided with a passage such as notch 328 as shown in FIG. 13 or orifice 330 as shown in FIGS. 14 and 15.

FIG. 14 shows the reservoir assembly when it is full of hydraulic fluid. The bag 326 is full as are the reservoir chamber parts 308 and 310. Should the fluid circuit connected with chamber part 308 require more fluid that the fluid circuit connected with chamber part 310 for any reason such as a leak or break in the fluid circuit, the reservoir condition shown in FIG. 12 may result. Most of the fluid in the bag 326 will have been removed, until the bag engages the bottom of standpipe 316 and closes off further connection of the interior of the bag with chamber part 308. The fluid level in chamber part 308 may then fall below the top of standpipe 316. Further removal of fluid from the bag through standpipe 316 is prevented. Chamber part 310 still has some fluid in it, and more may be taken from the bag 326 if needed.

FIG. 13 shows the condition when a leak or failure occurs in the fluid circuit connected with chamber part 310. The bag 326 collapses as fluid is drawn from it, and its bottom moves upwardly until it engages the bottom of standpipe downwardly extending portion 320, closing it off except for the restrictive orifice formed by notch 328 shown in FIG. 13 or orifice 330 shown in FIGS. 14 and 15. When chamber part 310 is emptied, as shown in FIG. 15, there is still some hydraulic fluid in standpipe 318. By providing the orifice 330 or the notch 328, this fluid may be available to chamber part 308 rather than being discharged through the circuit leak or failure.

The reservoir assembly is filled through the openings for filler caps 332 and 334, or either of them, as needed, and the filler caps are then inserted and tightened to seal the interior of the reservoir against atmospheric pressure leakage.

Figure 16:
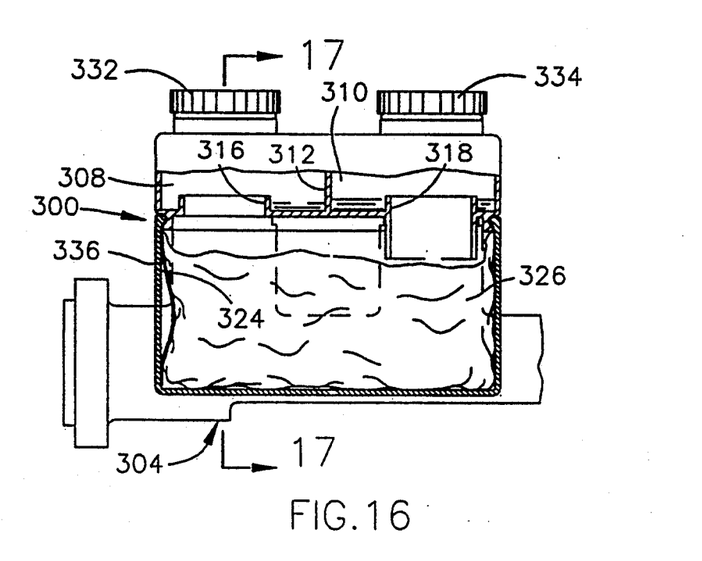
FIG. 16 is a cross section view similar to that of FIG. 13-15 showing the reservoir assembly before any hydraulic fluid is put in it, and also showing an arrangement for controlling the expansion of the flexible bag as it is filled with hydraulic fluid. The expansion control device may be used with any of the other disclosed reservoir assemblies having a flexible bag.

FIG. 16 shows the reservoir assembly 300 of FIGS. 12–15, with the addition of a flexible bag expansion control device 336. Device 336 is illustrated as a linear wave spring which takes up part of the volume in container 324, but which with a full load of hydraulic fluid in bag 326 will be pushed outwardly to allow some increase in bag volume. This is needed primarily when the reservoir assembly is already full to its design capacity but for some reason some additional fluid is pushed into the reservoir chambers. This could happen, for example, when the actuated device has been heated and then cools, forcing some additional fluid back to the reservoir.

Figure 17:
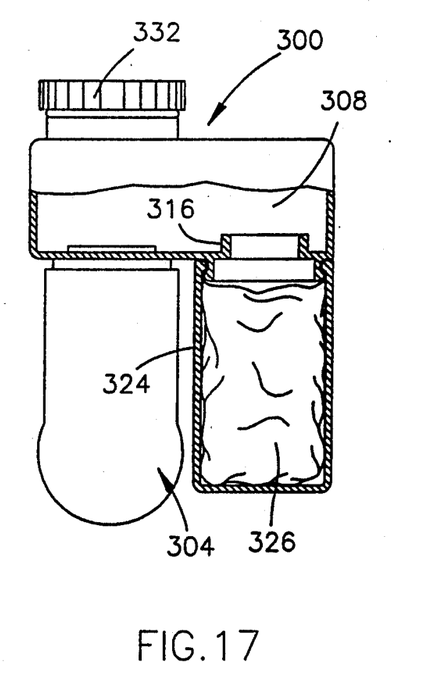
FIG. 17 is a cross section view with parts broken away of the reservoir assembly of FIG. 16 taken in the direction of arrows 17—17 of that FIGURE.

FIG. 17 shows the connection of the reservoir chamber upper part 308 with the interior of bag 326 through standpipe 316 and also the connection of that chamber part with the body 304.

Figure 18:
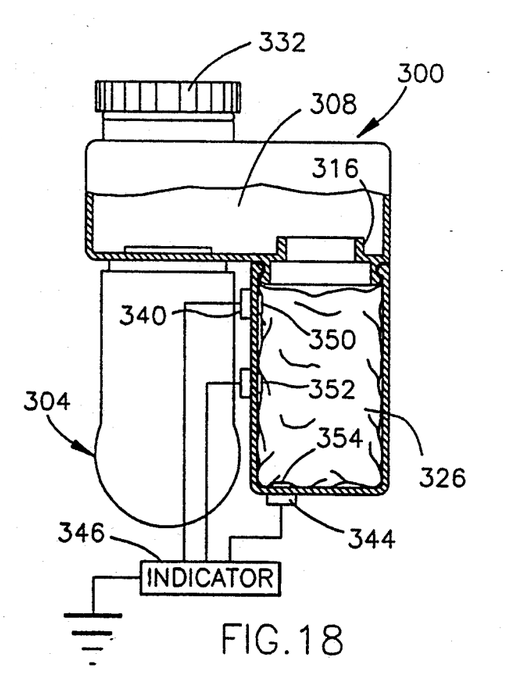
FIG. 18 is a cross section view with parts broken away showing the reservoir assembly of FIG. 17 and schematically illustrating an arrangement for indicating the amount of fluid in a reservoir chamber flexible bag. The indicator arrangement may be used with any of the other disclosed reservoir assemblies having a flexible bag.
Figure 19:
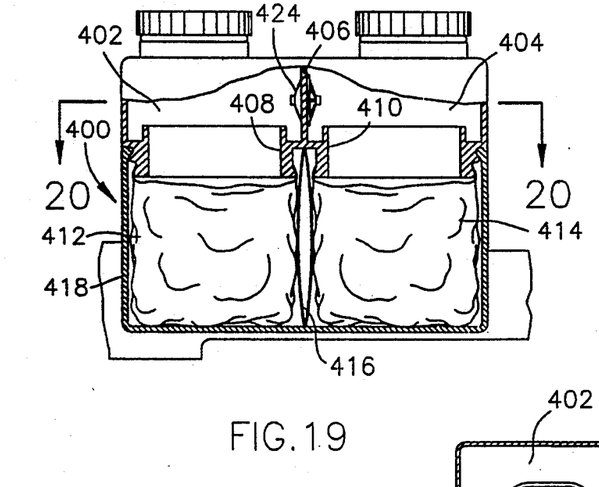
FIG. 19 is a view similar to FIG. 16 showing a modified reservoir assembly and a modified expansion control device.
Figure 20:
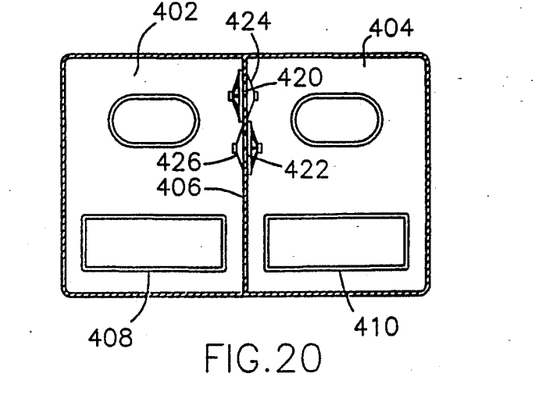
FIG. 20 is a cross section view of the reservoir assembly of FIG. 19 taken in the direction of arrows 20—20 of that FIGURE.

FIG. 18 is similar to FIG. 17. It shows the addition of a fluid level sensor arrangement for fluid in the flexible bag. Sensors 340 and 342 are mounted on the side of container 324 in vertically spaced relation, and sensor 344 is mounted on the bottom of container 324. These sensors are schematically illustrated as being electrically connected to an indicator bank 346 so that they will indicate the approximate fluid volume contained in the bag 326. Sensor actuators 350, 352 and 354 are respectively secured to bag 326 so that when the bag is in the position where it substantially fills container 324 the actuators are immediately adjacent one of the sensors and the sensors are actuated. As the bag is emptied of fluid, actuator 354 is lifted away from sensor 344 and that sensor is no longer actuated. Indicator bank 346 will then show that there is somewhat less fluid in the bag 326. Further fluid removal from the bag will cause further collapse of the bag and actuator 352 will be removed from the area of sensor 342. Still further removal of fluid and commensurate collapse of bag 326 will cause actuator 350 to be removed from the area of sensor 340. In each instance, the sensors will be deactuated and the indicator bank 346 will indicate that there is correspondingly less fluid in the bag. This indicator system may be used with any of the flexible reservoir bags of any of the reservoir assemblies having such bags.

FIGS. 19-22 show another modification of the reservoir assembly. Assembly 400 has fluid chamber upper parts 402 and 404 which are completely separated by divider wall 406. Their bottoms are respectively formed with upwardly and downwardly extending standpipes 408 and 410. Separate flexible reservoir chamber bags 412 and 414 are secured to the bottoms of standpipes 408 and 410 so that the interior of each bag is open only to its associated fluid chamber upper part 402 or 404. An expansion control device 416 is shown as being between the bags 412 and 414, thus acting on both of the bags. Of course, such devices may be provided for each bag adjacent the outer walls of the container 418 in which the bags 412 and 414 are positioned. Divider wall 406 is provided with orifices 420 and 422 to provide selective venting connection of chamber parts 402 and 404. These orifices are respectively provided with normally closed check valves 424 and 426. Check valve 424 opens at a predetermined pressure differential between chamber parts 402 and 404 when chamber part 404 has the higher pressure. Check valve 426 opens at a predetermined pressure differential between chamber parts 402 and 404 when chamber part 402 has the higher pressure. This effectively limits the amount of negative pressure that can be exerted on one of the flexible bags while normally keeping the two reservoir sections completely separate.

Figure 21:
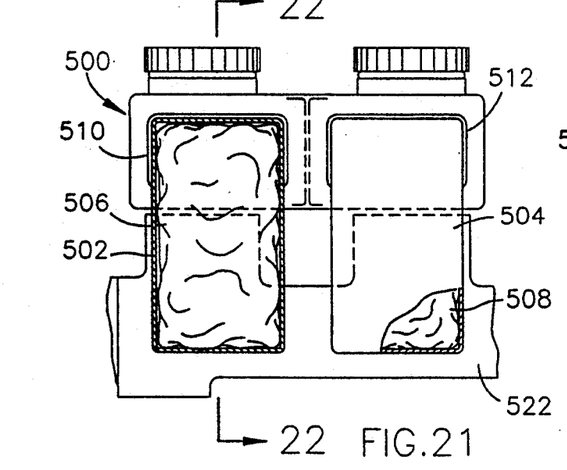
FIG. 21 is a side elevation view of another modified reservoir assembly with parts broken away and in section.
Figure 22:
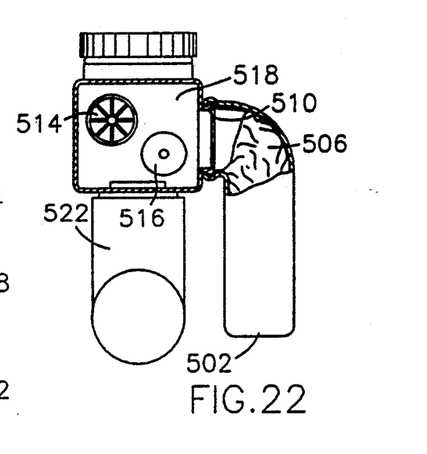
FIG. 22 is a cross section view of the reservoir assembly of FIG. 21 taken in the direction of arrows 22—22 of that FIGURE and having parts broken away.

FIGS. 21 and 22 illustrate a modified reservoir assembly 500 which is different from the reservoir assembly 400. There are separate containers 502 and 504 for the separate flexible bags 506 and 508. Containers 502 and 504 are connected to the sides of the reservoir upper chamber parts 510 and 512, as are the flexible bags. Similar check valves 514 and 516 are provided in the divider wall 518 to those shown in FIGS. 19 and 20. The connections to body 522 are similar to the connections shown in FIGS. 19 and 20 in which the chamber upper parts are connected to the body through the bottoms of those chamber upper parts.

What is claimed is:

1. A hydraulic fluid pressure reservoir assembly comprising:

a housing provided with a hydraulic fluid inlet and a hydraulic fluid outlet connected with each other and to which hydraulic fluid passage means are connected, said housing having a housing section defining hydraulic fluid reservoir chamber means to which said fluid inlet and said fluid outlet are selectively connected and disconnected, and valve control means selectively connecting said fluid reservoir chamber means to said fluid inlet and said fluid outlet and also maintaining the connection of said fluid inlet and said fluid outlet to each other while closing the connection of said fluid reservoir chamber means to said fluid inlet and said fluid outlet, said fluid inlet and said fluid outlet selectively respectively becoming a fluid outlet and a fluid inlet when hydraulic fluid flow therebetween is reversed;

said reservoir housing fluid reservoir chamber means housing section having a first part comprising a first portion of said hydraulic fluid reservoir chamber means and extending over the part of said housing containing said valve control means and then a second part comprising a second portion of said hydraulic fluid reservoir chamber means and extending laterally beyond and then downwardly alongside the part of said housing containing said valve control means, and means for moving hydraulic fluid between said fluid reservoir chamber means and said fluid inlet and said fluid outlet as hydraulic fluid in said reservoir is removed and returned via said valve control means.

2. The hydraulic fluid pressure reservoir assembly of claim 1 further including a flexible bag mounted within said reservoir housing fluid reservoir chamber means housing section second part, the interior of said flexible bag defining at least some of said second portion of said reservoir housing hydraulic fluid reservoir chamber means, said flexible bag interior increasing in effective volume to accommodate hydraulic fluid being returned thereto and decreasing in effective volume as hydraulic fluid is being removed therefrom.

3. The hydraulic fluid pressure reservoir assembly of claim 2, said means for moving hydraulic fluid comprising the combination of a subatmospheric pressure selectively imposed within said fluid reservoir chamber means and ambient atmospheric pressure acting on the exterior of said flexible bag.

4. The hydraulic fluid pressure reservoir assembly of claim 2, said means for moving hydraulic fluid selectively alternatively comprising the first combination of a subatmospheric pressure within said fluid reservoir chamber means and ambient atmospheric pressure acting on the exterior of said flexible bag to move hydraulic fluid from said second portion of said fluid reservoir chamber means, and the second combination of a superatmospheric fluid pressure returning hydraulic fluid under pressure to said fluid reservoir chamber means via said valve control means, said returning hydraulic fluid increasing the effective volume of said flexible bag as it flows into said flexible bag.

5. The hydraulic fluid pressure reservoir assembly of claim 1, said means for moving hydraulic fluid comprising siphon tube means extending through said hydraulic fluid reservoir chamber means with one end located near the bottom of said fluid reservoir chamber means second portion and the other end being selectively connected and disconnected under control of said valve control means to said fluid inlet and said fluid outlet.

6. A brake pressurizing and release mechanism including a master cylinder assembly and the hydraulic fluid pressure reservoir assembly of claim 1, said master cylinder assembly including a master cylinder connected to said reservoir housing, said master cylinder having a fluid pressure output and return opening which is fluid connected with said fluid inlet, said master cylinder when actuated generating hydraulic fluid pressure delivered to said fluid inlet with hydraulic fluid flow, said hydraulic fluid flow acting on said valve control means to close said connection of said fluid inlet and said fluid outlet to said reservoir hydraulic fluid chamber means, said master cylinder when released releasing the generated hydraulic fluid pressure beyond said fluid outlet and between said fluid outlet and said master cylinder so that reverse fluid flow occurs and said valve control means opens said connection of said fluid inlet and said fluid outlet to said reservoir hydraulic fluid chamber means in response to the reversed hydraulic fluid flow from said fluid outlet toward said fluid inlet, the reverse hydraulic fluid returning hydraulic fluid via said fluid outlet to said reservoir hydraulic fluid chamber means.

7. The hydraulic fluid pressure reservoir assembly of claim 1, said reservoir assembly having hydraulic fluid filling accommodation means and reservoir cover means, and when placed in operational use being filled with hydraulic fluid to a predetermined level and sealed at said fluid filling accommodation means and said reservoir cover means against leakage of air into said reservoir hydraulic fluid chamber means, said fluid inlet and said fluid outlet being a first fluid inlet and a first fluid outlet and said housing having a second fluid inlet and a second fluid outlet, said valve control means being first valve control means and said housing having second valve control means, said assembly further comprising:

said hydraulic fluid reservoir chamber means first portion having a bottom, a divider dam extending upwardly from said bottom and dividing said hydraulic fluid reservoir chamber means first portion into a first side and a second side with said first side being selectively connected and disconnected with said first fluid inlet and said first fluid outlet with said second side being selectively connected and disconnected with said second fluid inlet and said second fluid outlet, means providing fluid communication between said first and second sides at the upper part of said divider dam, first and second standpipes extending upwardly from said bottom respectively in said first and second sides and by their heights from said bottom determining the minimum height of hydraulic fluid in each of said first and second sides, said standpipes opening through said bottom with said second standpipe having a downwardly extending portion extending downwardly from said bottom and opening into said hydraulic fluid reservoir chamber means second portion;

said hydraulic fluid reservoir chamber means second portion being flexible bag means opening under and operatively secured to said bottom so that said standpipes are in fluid communication with the interior of said flexible bag means;

said flexible bag means collapsing upwardly as hydraulic fluid is removed from said fluid reservoir chamber means and expanding downwardly as hydraulic fluid is returned to said fluid reservoir chamber means, said flexible bag means upon being emptied of hydraulic fluid to a predetermined extent engaging said second standpipe downwardly extending portion and closing same against further hydraulic fluid transfer from said fluid reservoir chamber means second portion to said fluid reservoir chamber means first portion second side through said second standpipe while remaining in fluid communication with said first standpipe and permitting further fluid transfer from said fluid reservoir chamber means second portion to said fluid reservoir chamber means first portion through said first standpipe into said first side.

8. The hydraulic fluid pressure reservoir assembly of claim 7, said second standpipe downwardly extending portion having an orifice therein when said flexible bag is in engagement with said standpipe downwardly extending portion, said orifice providing limited hydraulic fluid communication with said fluid reservoir chamber means second portion and the interior of said flexible bag to prevent early cutoff of reserve hydraulic fluid from said flexible bag by early sealing of said bag with said second standpipe downwardly extending portion.

9. The hydraulic fluid pressure reservoir assembly of claim 1, said reservoir assembly having hydraulic fluid filling accommodation means and reservoir cover means, and when placed in operational use being filled with hydraulic fluid to a predetermined level and sealed at said fluid filling accommodation means and said reservoir cover means against leakage of air into said reservoir hydraulic fluid chamber means, said fluid inlet and said fluid outlet being a first fluid inlet and a first fluid outlet and said housing having a second fluid inlet and a second fluid outlet, said valve control means being first valve control means and said housing having second valve control means, said assembly further comprising:

said hydraulic fluid reservoir chamber means first portion having a bottom, a divider dam extending upwardly from said bottom and dividing said hydraulic fluid reservoir chamber means first portion into a first side and a second side with said first side being selectively connected and disconnected with said first fluid inlet and said first fluid outlet by said first valve means and said second side being selectively connected and disconnected with said second fluid inlet and said second fluid outlet by said second valve means, means providing fluid communication between said first and second sides at the upper part of said divider dam, first and second standpipes extending upwardly from said bottom respectively in said first and second sides and by their heights from said bottom determining the minimum height of hydraulic fluid in each of said first and second sides, said standpipes opening through said bottom and opening into said hydraulic fluid reservoir chamber means second portion;

said hydraulic fluid reservoir chamber means second portion being the interiors of first and second flexible bag means, said first and second flexible bag means opening under and being operatively secured to said bottom so that said first and second standpipes are respectively in fluid communication with the interiors of said first and second flexible bag means;

said first and second flexible bag means separately collapsing upwardly as hydraulic fluid is removed from said fluid reservoir chamber means and expanding downwardly as hydraulic fluid is returned to said fluid reservoir chamber means;

said means providing hydraulic fluid communication between said first and second sides of said fluid chamber means first portion at the upper part of said divider dam being first and second orifice means through said divider dam and first and second normally closed check valves respectively controlling the opening and closing of said first and second orifice means, said first check valve opening when the pressure in said first side of said fluid chamber means first portion is less than the pressure in said second side of said fluid chamber means first portion by a predetermined pressure differential, and said second check valve opening when the pressure in said first side of said fluid chamber means first portion is greater than the pressure in said second side of said fluid chamber means first portion by a predetermined pressure differential.

10. The hydraulic fluid pressure reservoir assembly of claim 1, said reservoir assembly having fluid filling accommodation means and reservoir cover means, and when placed in operational use being filled with hydraulic fluid to a predetermined level and sealed at said fluid filling accommodation means and said reservoir cover means against leakage of air into said reservoir fluid chamber means, said fluid inlet and said fluid outlet being a first fluid inlet and a first fluid outlet and said housing having a second fluid inlet and a second fluid outlet, said valve control means being first valve control means and said housing having second valve control means, said assembly further comprising:

said fluid reservoir chamber means first portion having a bottom having first and second openings therein, a divider dam extending upwardly from said bottom and dividing said fluid reservoir chamber means first portion into a first side and a second side with said first side being selectively connected and disconnected through said first bottom opening with said first fluid inlet and said first fluid outlet by said first valve means and said second side being selectively connected and disconnected through said second bottom opening with said second fluid inlet and said second fluid outlet by said second valve means, means providing fluid communication between said first and second sides at the upper part of said divider dam, first and second side openings respectively extending outwardly from said first and second sides and opening into said fluid reservoir chamber means second portion;

said fluid reservoir chamber means second portion being first and second flexible bag means extending outwardly and downwardly from said first and second side openings and respectively opening into and being operatively secured about said first and second side so that said first and second side openings are respectively in fluid communication with the interiors of said first and second flexible bag means;

support container means for support and protection of said first and second flexible bag means, said support container means containing said first and second flexible bag means therein and secured to said reservoir housing;

said first and second flexible bag means separately collapsing upwardly as hydraulic fluid is removed from said fluid reservoir chamber means and expanding downwardly as hydraulic fluid is returned to said fluid reservoir chamber means;

said means providing fluid communication between said first and second sides of said fluid chamber means first portion at the upper part of said divider dam being first and second orifice means through said divider dam and first and second normally closed check valves respectively controlling the opening and closing of said first and second orifice means, said first check valve opening when the pressure in said first side of said fluid chamber means first portion is less than the pressure in said second side of said fluid chamber means first portion by a predetermined pressure differential, and said second check valve opening when the pressure in said first side of said fluid chamber means first portion is greater than the pressure in said second side of said fluid chamber means first portion by a predetermined pressure differential.

11. A brake pressurizing and release mechanism including a master cylinder assembly and the hydraulic fluid pressure reservoir assembly of claim 1, said master cylinder assembly including a master cylinder housing integrally formed with said reservoir assembly housing, said master cylinder housing having valve chamber means formed therein, said valve control means being in said valve chamber means and said fluid inlet and said fluid outlet being in continuous communication with said valve chamber means, said reservoir assembly providing the hydraulic fluid reservoir for said master cylinder assembly.

12. The hydraulic fluid pressure reservoir assembly of claim 2, said flexible bag having a container receiving same therein which protects said bag and supports said bag when said bag is substantially full of hydraulic fluid, and bag expansion control means received in said container and engageable by said bag as said bag is being filled with hydraulic fluid to provide a yieldable space into which said bag may expand when needed but is normally kept from expanding into said space by said bag expansion control means, said bag expansion control means being spring means.

13. In a hydraulic pressure actuating system having hydraulic pressure actuated means, a first housing assembly having therein hydraulic fluid reservoir chamber means, a second housing assembly defining a master cylinder housing and having said first housing assembly mounted thereon, a master cylinder assembly including said master cylinder housing in said second housing assembly for controllably generating and releasing hydraulic pressure for actuation and release of said hydraulic pressure actuated means, said master cylinder housing having a body with a bore formed therein and movable hydraulic pressure generating means received in said bore and defining with said bore hydraulic pressure generating chamber means, hydraulic fluid passage means formed in part in said master cylinder housing and including chamber means defining a fluid reservoir section on which said first housing assembly is mounted and to which said first housing assembly reservoir chamber means is fluid connected, said hydraulic fluid passage means connecting said master cylinder hydraulic pressure generating chamber means and said first housing assembly reservoir chamber means and said hydraulic pressure actuated means, means for actuating said master cylinder assembly, and means mounting said first housing assembly and said second housing assembly, the improvements comprising:

at least a part of said first housing assembly reservoir chamber means being mounted at the highest point in said hydraulic pressure actuating system, said first housing assembly being provided with a fluid inlet and a fluid outlet to which said hydraulic fluid passage means are connected, said first housing assembly fluid reservoir chamber means being connected to said fluid inlet and said fluid outlet, and valve control means selectively connecting said first housing assembly fluid reservoir chamber means to said fluid inlet and said fluid outlet and also selectively connecting said fluid inlet and said fluid outlet while closing the connection of said first housing assembly fluid reservoir chamber means to said fluid inlet and said fluid outlet;

said first housing assembly fluid reservoir chamber means having a first part extending over and then a second part extending downwardly alongside the part of the one of said first and second housing assemblies containing said valve control means, and means for moving hydraulic fluid between said first housing assembly fluid reservoir chamber means and said fluid inlet and said fluid outlet as fluid in said first housing assembly reservoir chamber means is removed and returned via said valve control means.

14. In the improved hydraulic pressure actuating system of claim 13, said second part of said first housing assembly fluid reservoir chamber means including a flexible hydraulic fluid-containing bag the interior of which increases in effective volume to accommodate hydraulic fluid being returned thereto and decreases in effective volume as hydraulic fluid is being removed therefrom.

15. In the improved hydraulic pressure actuating system of claim 14, said means for moving hydraulic fluid comprising the combination of a subatmospheric pressure selectively imposed within said first housing assembly fluid reservoir chamber means and ambient atmospheric pressure acting on the exterior of said flexible bag so as to decrease the amount of hydraulic fluid inside said flexible bag to move fluid from said first housing assembly fluid reservoir chamber means.

16. In the improved hydraulic pressure actuating system of claim 14, said means for moving hydraulic fluid selectively alternatively comprising a first combination of a subatmospheric pressure within said fluid reservoir chamber means and ambient atmospheric pressure acting on the exterior of said flexible bag to move hydraulic fluid from said second part of said fluid reservoir chamber means, and a second combination of a superatmospheric fluid pressure returning hydraulic fluid under pressure to said fluid reservoir chamber means via said valve control means with ambient atmospheric pressure still acting on the exterior of said flexible bag, said returning hydraulic fluid increasing the effective volume of said flexible bag.

17. In the improved hydraulic pressure actuating system of claim 14, said flexible bag having a container in which said flexible bag is received, protected and supported when containing hydraulic fluid therein; sensor means secured at multiple level positions to said container; sensor actuating means secured to said flexible bag and with said flexible bag substantially full of hydraulic fluid actuating said sensors to generate signals indicating that said flexible bag is substantially full of hydraulic fluid, said sensor actuating means moving away from said sensor means as said flexible bag collapses with removal of hydraulic fluid therefrom and causing said sensor means to generate signals indicating the decrease in volume of said flexible bag and therefore the decrease of the amount of hydraulic fluid in said flexible bag.

18. In the improved hydraulic pressure actuating system of claim 13, said means for moving hydraulic fluid comprising siphon tube means extending through said first housing assembly fluid reservoir chamber means with one end located near the bottom of said first housing assembly fluid reservoir chamber means second part and the other end being selectively connected and disconnected under control of said valve control means to said fluid inlet and said fluid outlet.

19. The hydraulic fluid pressure actuating system of claim 13 wherein said first housing assembly and said second housing assembly are a common body with said common body having valve chamber means formed therein containing said valve control means.

* * * * *